L. J. R. HOLST.
MEANS FOR DETERMINING GROUND SPEED.
APPLICATION FILED SEPT. 8, 1916.
1,224,545.
Patented May 1, 1917.
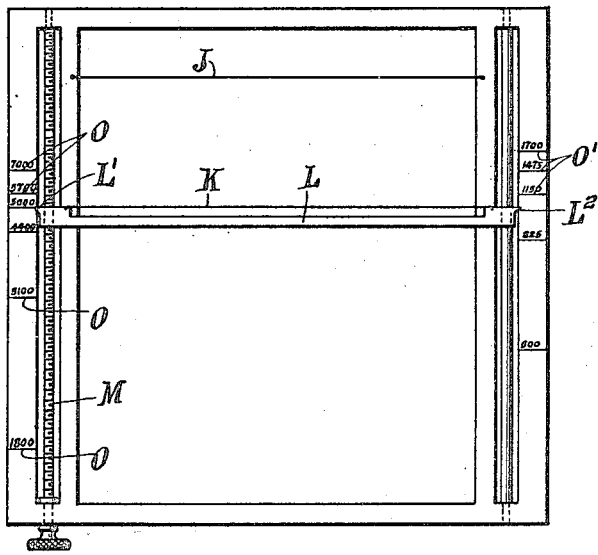
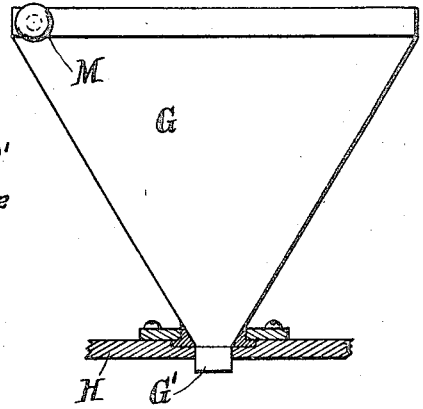
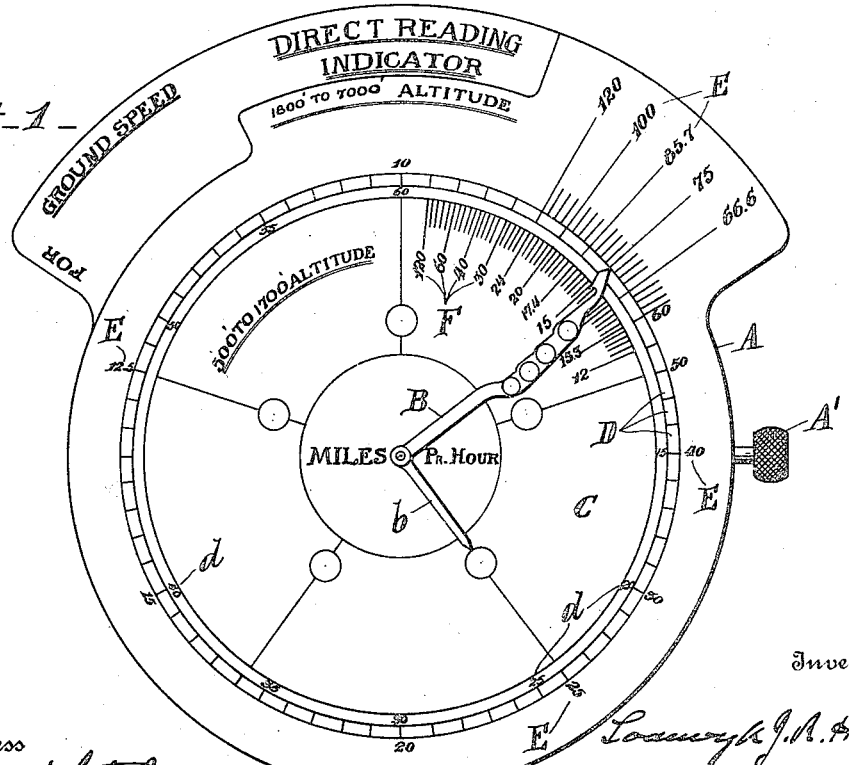

UNITED STATES PATENT OFFICE.

LODEWYK J. R. HOLST, OF PHILADELPHIA, PENNSYLVANIA, ASSIGNOR TO ARTHUR BROCK, JR., OF PHILADELPHIA, PENNSYLVANIA.

MEANS FOR DETERMINING GROUND SPEED.

1,224,545.  Specification of Letters Patent.  Patented May 1, 1917.

Application filed September 8, 1916. Serial No. 118,956.

*To all whom it may concern:*

Be it known that I, LODEWYK J. R. HOLST, a citizen of the United States, residing in the city and county of Philadelphia and State of Pennsylvania, have invented a certain new and useful Improvement in Means for Determining Ground Speed, of which the following is a true and exact description, reference being had to the accompanying drawings, which form a part thereof.

My present invention comprises improvements for use in determining the so called ground speed of air craft; *i. e.*, the speed of the air craft relative to the earth's surface. My invention is especially devised and adapted for use on an aeroplane or like air craft to determine its movement over the earth's surface, but the invention is also well adapted for use at a fixed point or on a moving object to determine the speed relative to the point or object at, or on which the apparatus is located, of an air craft within the range of vision from that point or object.

The primary object of the invention is to provide simple and effective means for determining the ground speed of an aeroplane or other air craft in miles per hour, or like units of speed in such manner as to require no calculation, and a minimum of observations and manipulations on the part of the observer.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of my invention.

Of the drawings:

Figure 1 is an elevation of a stop watch or like timing device having its dial marked in accordance with the present invention; and Fig. 2 is a side elevation; and Fig. 3 a plan of a camera obscura employed in determining the beginning and the end of the time interval required for the air craft to cover a predetermined distance.

In the drawings, A represents a timing mechanism of the stop watch type, and A' the button or like operating device for starting and stopping the timing mechanism. B represents the second hand and $b$ the minute hand of the timing mechanism. On the dial C of the timing mechanism are a series of scale marks D preferably spaced at equal distances apart. Associated with the scale marks D are one or more sets of index symbols which are graduated in miles per hour, or analogous units of speed. As shown, there are two sets E and F of these symbols. For convenience a set of index symbols $d$ graduated in units of time may well be associated with the marks D, though the symbols $d$ are not essential features of my invention. With the dial markings shown, the hand B is intended to make one complete revolution in a minute, and the minute hand $b$ one complete revolution in five minutes.

In conjunction with the timing mechanism A, I employ means for indicating the beginning and the end of the time interval required for the air craft to travel over a given horizontal distance. In the simple and preferred form illustrated, a camera obscura G, is employed as the means for marking the beginning and end of this time interval. As shown, the camera G comprises a housing mounted to rotate about a vertical axis in a support H. The camera G is provided at one end with a lens mounted in a suitable lens carrier G', and at the other end with a ground glass or analogous screen I. The ground glass, as shown, is formed or provided with parallel and relatively movable straight marks J and K. The mark J may be drawn on, or otherwise fixed with respect to the ground glass screen I. As shown, the mark K is formed by a wire parallel and in close proximity to the surface of the screen I and having its opposite ends connected to a bow like holder L which is in sliding engagement with the frame work of the camera and may be moved, to cause the mark K to approach and recede from the line J, by the manipulation of an adjusting screw M. One or more sets of scale markings are provided on the camera frame for use in conjunction with the frame L in determining the proper setting of the latter which is dependent upon the elevation of the air craft. As shown, there are two sets O and O' of these markings coöperating with pointers L' and L² respectively on the frame L. The scale O is used with a relatively high range of air craft elevation, say from 1800 to 7000 feet elevation, and the scale O' is used with a lower range of air craft elevation, say from 500 to 1800 feet elevation. Each of these scales comprises index symbols directly indicating the various altitudes for which the frame L is to be set. The scales O and E are used together and the scale O' is used in conjunction with the scale F.

The purpose of the scales O and O' and the adjustable relation between the marks J and K is to make it easy to set these marks at such a distance apart that with the camera on the aeroplane at any known altitude within the range of the apparatus an image of an object on the earth's surface appearing on the screen I will travel over the latter, between, and in a direction perpendicular to the marks J and K in a predetermined base time interval when the ground speed of the aeroplane is equal to a certain predetermined base speed. The distance between the marks J and K with the apparatus properly adjusted is thus equal in length to the image on the screen of a horizontal line at the earth's surface equal in length to the base distance traveled in the base time interval at the base speed. In practice the actual distance for each altitude between the marks J and K is determined by multiplying the focal length of the camera G by the base distance and dividing the product by the altitude. The resultant quotient is the desired distance.

The focal length of the camera, and the base speed and time intervals may be varied in practice between quite wide limits. As an example of convenient and satisfactory proportions the camera G may be one having a focal length of eighteen inches, and in such case the scale markings O and E may, and in fact are proportioned to correspond to a base time interval of five seconds, a base ground speed of 120 miles per hour and a base distance of 880 feet. With this apparatus mounted on an aeroplane, therefore, when the mark X is adjusted to the proper distance from the mark J for the aeroplane elevation, the image of an object on the earth's surface appearing on the screen I and moving perpendicularly to the marks J and K, will move along the screen between these marks in five seconds, provided the ground speed of the aeroplane is 120 miles per hour. The scale marks O' and F may conveniently, and in practice do correspond to a base time interval of five seconds, a base ground speed of 120 miles per hour and a base distance of 176 feet.

The use of the two sets of scale marks E and F coöperating respectively with the scale markings O and O' makes it possible to employ a convenient period of observation of the travel of an image across the ground glass screen I of the camera G while employing apparatus and scale markings of convenient proportions.

In the use of the invention on an aeroplane or other air craft, the camera G is first revolved about its vertical axis as required to set the marks J and K perpendicular to the direction of travel on the screen I of the images of objects on the earth's surface appearing on the screen, and the frame L moved to bring the pointer L' into register with the scale mark O or O' corresponding to the air craft altitude which must be determined as by reading a suitable barometer. With the camera thus adjusted, the observer starts the timing mechanism A at the instant the image of some object on the earth's surface crosses one of the lines J and K moving perpendicularly toward the other, and stops the timing mechanism A the instant at which this image completes its travel across the space between the lines. The second hand B of the timing mechanism will then register with the symbol of the set E or F accordingly as the camera scale O or O' is employed, which expresses the ground speed of the aeroplane.

For example, with the apparatus set as shown in the drawings and assuming an aeroplane elevation of 5000 feet as is indicated by the position of the pointer L' with reference to the scale marks O, then the position of the hand B which points at the symbol 75 of the E set of symbols, indicates an air craft ground speed of 75 miles per hour. With such a speed and setting of the apparatus, the air craft would require eight seconds to pass over the horizontal base distance of 880 feet which would have been passed over in five seconds if the air craft had been traveling at the base ground speed of 120 miles per hour. Assuming on the other hand that the air craft is traveling at an elevation of approximately 1000 feet, as the setting of the pointer $L^2$ with reference to the scale O' indicates then the position of the hand B with reference to the scale F, indicates an air craft ground speed of 15 miles per hour. In this case the base distance traversed in eight seconds is 176 feet.

The use of the apparatus located at a fixed point or on some object traveling over the surface of the earth to determine the ground speed of an air craft relative to the point or object is analogous to that already described. In this case, however, the camera G is inverted and the time interval required for the image of the air craft to travel across the screen I between the marks J and K is observed. The camera is adjusted, of course, with reference to the elevation of the air craft, which may be determined according to ordinary geometrical methods, and with reference to the direction of travel of the aeroplane so that the image of the aeroplane will travel across the ground glass screen I of the camera in a direction perpendicular to the lines J and K.

With either of the described modes of use the angular adjustment of the camera G necessary to set the lines J and K perpendicular to the apparent line of travel of the image observed, gives a direct measure of the so called "drift" of the aeroplane.

The simplicity of observation and avoidance of all necessity for calculation makes my improved ground speed measuring apparatus of practical utility for various purposes. It is particularly important, however, for use on aeroplanes and dirigible balloons used for bomb dropping purposes. For such use accuracy of aim necessitates a definite knowledge of the air craft ground speed and this knowledge must be acquired by an observer who has but little time in which to determine the speed and as a rule has numerous other things to attend to. The apparatus is also useful when located at the earth's surface to determine the ground speed of the air craft against which it is desired to direct gun fire.

While in accordance with the provisions of the statutes I have illustrated and described the best form of my invention now known to me, it will be apparent to those skilled in the art that changes can be made in the form of my invention without departing from its spirit, and that some features of my invention may be used without a corresponding use of other features.

Having now described my invention, what I claim as new and desire to secure by Letters Patent, is:—

1. Apparatus for determining the ground speed of air craft comprising in combination means, adjustable for different air craft elevations, for determining the beginning and end of the time interval required for an air craft to travel a predetermined distance over the earth's surface, and a timing mechanism graduated in units of ground speed for measuring the duration of said time interval.

2. Means for measuring the ground speed of an air craft comprising a camera obscura having adjusting means for setting a pair of parallel marks on the image receiving screen of the camera at varying distances from one another and having means for indicating different predetermined settings of the marks for different air craft altitudes, and in combination therewith a time measuring device comprising an indicating member adapted to travel at a constant speed and a scale graduated in ground speed units for measuring the travel of said member.

3. Means for measuring the ground speed of an air craft comprising a camera obscura having adjustable means for setting a pair of parallel marks on the image receiving screen of the camera at varying distances from one another and having means, including a scale graduated in units of altitude, for indicating settings of the marks, for different altitudes, at distances apart which are each in the same predetermined inverse ratio to the corresponding altitude, and in combination therewith a time measuring device comprising an indicating member adapted to travel at a constant speed, and a scale for measuring the travel of said member and bearing symbols indicating ground speeds inversely proportional to the amount of travel of said member.

LODEWYK J. R. HOLST.